J. STROMEYER.
HEAT RESISTING PACKING.
APPLICATION FILED MAR. 15, 1917.

1,330,148.

Patented Feb. 10, 1920.

Inventor
Julius Stromeyer
By 
Attorney

Witness
E. W. Smith

UNITED STATES PATENT OFFICE.

JULIUS STROMEYER, OF PHILADELPHIA, PENNSYLVANIA.

HEAT-RESISTING PACKING.

1,330,148.        Specification of Letters Patent.        Patented Feb. 10, 1920.

Application filed March 15, 1917. Serial No. 154,990.

*To all whom it may concern:*

Be it known that I, JULIUS STROMEYER, a citizen of the United States, and resident of Philadelphia, county of Philadelphia, and State of Pennsylvania, have invented an Improvement in Heat-Resisting Packing, of which the following is a specification.

The object of my invention is to provide packing in sheet, molded or other forms which shall be suitable for use in joints and other places which are liable to high temperature; and more especially as found in steam pipes employing unions comprising flanges bolted together and with interposed packing gaskets.

My invention consists of a packing having a body largely composed of yielding material, preferably rubber or rubberized fabric, incorporated with magnesite in a state of fine subdivision.

More particularly my improved packing in sheet form consists of alternate layers or bodies of textile fabric and a mixture of rubber and magnesite powder, the same being vulcanized to constitute a dense unitary sheet.

My invention also comprehends other forms of packing containing magnesite and which, together with the features above stated, are hereinafter set out and claimed.

Figure 1:
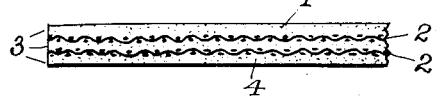
Figure 2:
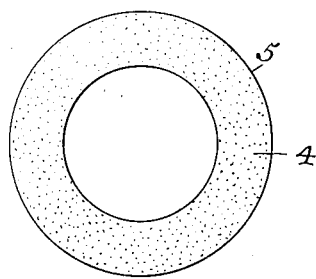
Figure 3:
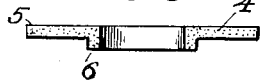
Figure 4:
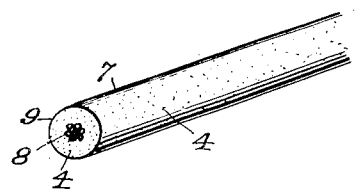
Figure 4:

My invention will be better understood by reference to the drawings, in which:

Figure 1 is a cross section of a piece of sheet packing embodying my invention; Fig. 2 is a plan view of an annular gasket embodying my invention; Fig. 3 is a cross section of a gasket in molded form embodying my invention; and Fig. 4 is a perspective view of a rope like form embodying my invention.

Referring to the sheet packing in Fig. 1, it comprises one or more layers of textile fabric 2 (such as canvas) with layers 3 of rubber incorporated with a powder of magnesite, particles of which are indicated at 4, and the whole vulcanized into a compact sheet. In this sheet form, the outermost layers are of the rubber and magnesite mixture. In practice, the sheet may be composed simply of two rubberized textile layers incorporated with the magnesite powder particles, whereby a minimum quantity of rubber is required and a more dense packing provided.

A packing sheet of the above composition may be stamped into annular or ring form as indicated in Fig. 2, and the gaskets so formed are well suitable for packing of steam pipes where high temperature is frequently found.

In Fig. 3, I have shown my improved packing material in molded form 5 and 6, and composed essentially of the mixture of rubber and magnesite powder and vulcanized. The molded articles may be reinforced by textile layers as in Fig. 1, if so desired.

In Fig. 4, I have shown my invention in rope or strand form 7 and consisting of a core of textile material 8 with a surrounding inclosing body 9 of rubber and magnesite powder, the latter being incorporated throughout the mass and vulcanized.

The magnesite powder is incorporated with the rubber before vulcanization; and in the mass, provides a non-conductor of heat which acts to preserve the packing when overheated. The magnesite also acts to produce with the rubber a dense composition, which hardens under the application of heat and pressure and in this way forms a packing of excellent quality which will not overheat.

In practice, the rubber compound before being vulcanized is intimately mixed with sufficient pulverized magnesite to provide the heat resisting quality, but the magnesite must not be in a sufficient quantity to materially deteriorate the tenacity of the rubber compound when vulcanized. In cases where the article is provided with internal textile layers or cores, the amount of magnesite employed may be greater than where such textile material is not employed, as the additional strengthening due to the textile material will coöperate to compensate for the otherwise weakening of the rubber compound by the greater quantity of magnesite powder. The magnesite powder being thoroughly incorporated with the rubber compound, imparts to the same not only an increased density, but a heat resisting quality which will enable the packing to withstand a materially greater temperature than is heretofore possible with rubber gaskets as ordinarily made.

While it is common to employ sheet gaskets or packing between surfaces such as flanges and pipes, it is also a practice to employ circular or strip packing set in grooves in the opposing faces and such requirements will be more particularly answered by the form of my invention illustrated in Fig. 4.

Having now described my invention, what I claim as new and desire to secure by Letters Patent, is:—

1. As an article of manufacture, a heat resisting packing consisting of vulcanized rubber compound having magnesite in a state of fine subdivision incorporated and distributed therein.

2. As an article of manufacture, a heat resisting sheet packing consisting of rubberized fabric and rubber compound incorporated with finely subdivided magnesite, and the mass vulcanized.

3. As an article of manufacture, an annular heat resisting gasket consisting of a flat body of alternate rubber and fabric and with magnesite in a state of fine subdivision incorporated with and distributed throughout the rubber layers.

In testimony of which invention, I hereunto set my hand.

JULIUS STROMEYER.

Witnesses:
R. M. HUNTER,
E. W. SMITH.